(12) United States Patent
Hori et al.

(10) Patent No.: US 6,802,233 B2
(45) Date of Patent: Oct. 12, 2004

(54) TRANSMISSION FOR INTERNAL COMBUSTION ENGINE

(75) Inventors: Yoshiaki Hori, Saitama (JP); Tohru Nishi, Saitama (JP); Seiji Hamaoka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/287,591

(22) Filed: Nov. 5, 2002

(65) Prior Publication Data

US 2003/0136220 A1 Jul. 24, 2003

(30) Foreign Application Priority Data

Nov. 7, 2001 (JP) ........................................ 2001-342278

(51) Int. Cl.[7] .............................................. F16H 47/00
(52) U.S. Cl. ...................................... 74/730.1; 74/331
(58) Field of Search .............................. 74/730.1, 325, 74/331, 333, 339, 606 R

(56) References Cited

U.S. PATENT DOCUMENTS

| | | | | |
|---|---|---|---|---|
| 4,427,088 A | * | 1/1984 | Tsuboi | 180/219 |
| 4,754,662 A | * | 7/1988 | Misawa | 74/473.22 |
| 4,879,919 A | * | 11/1989 | Sekizaki | 74/337.5 |
| 4,920,825 A | * | 5/1990 | Okazaki et al. | 74/606 R |
| 6,454,040 B1 | * | 9/2002 | Fukuda | 180/374 |
| 6,484,607 B2 | * | 11/2002 | Shichinohe et al. | 74/730.1 |
| 6,497,211 B2 | * | 12/2002 | Nomura et al. | 123/195 R |

FOREIGN PATENT DOCUMENTS

JP 8-1251 B2 1/1996

* cited by examiner

*Primary Examiner*—Tisha Lewis
(74) *Attorney, Agent, or Firm*—Birch, Stewart, Kolasch & Birch, LLP

(57) ABSTRACT

A compact transmission for an internal combustion engine in a saddle ride type vehicle for operating on wasteland that effectively utilizes space and enables members to be laid out freely. A transmission for internal combustion engine, includes a crankshaft disposed in parallel to the operating direction of a vehicle body. A forward-running/backward-running changeover mechanism is provided wherein the supply sources of a working oil and a lubricating oil for an automatic transmission are arranged concentratedly on the side of a front crankcase cover. The changeover mechanism is provided between a rear crankcase and a rear crankcase cover. A forward-running/backward-running changeover shift drum is disposed on the upper side of a plane containing the axis of a main shaft and the axis of a counter shaft of the transmission. One end portion of a shift spindle projects from the rear crankcase cover at a position on a lateral side of the shift drum.

14 Claims, 8 Drawing Sheets

TRANSMISSION FOR INTERNAL COMBUSTION ENGINE

CROSS-REFERENCE TO RELATED APPLICATIONS

The present nonprovisional application claims priority under 35 USC 119 to Japanese Patent Application No. 2001-342278 filed on Nov. 7, 2001 the entire contents thereof is hereby incorporated by reference.

BACKGROUND OF THE INVENTION

1. Field of the Invention

The present invention relates to a transmission for an internal combustion engine of a saddle ride type vehicle for operating on wasteland (buggy car).

2. Description of Background Art

As described in Japanese Patent Publication No. Hei 8-1251, a conventional internal combustion engine of a saddle ride type vehicle is of the type wherein a crankshaft is disposed laterally and a transmission includes a main shaft, a counter shaft, a forward-running intermediate shaft, a backward-running intermediate shaft, and an output shaft, which are parallel to the crankshaft.

In the conventional structure, all the shafts are disposed laterally in parallel to each other, so that there is a defect wherein the lateral width of the crankcase is large and the front-side projection area of the crankcase is large. In addition, two intermediate shafts are provided for forward operating and backward operating and the number of rotary shafts is large, leading to an increase in the number of component parts, a rise in weight, and a rise in cost. Besides, since the number of shafts is large, there is a defect wherein the cross-sectional area orthogonal to the shafts is large.

SUMMARY AND OBJECTS OF THE INVENTION

The present invention aims at making it possible to make a compact transmission, to effectively utilize space, and to freely lay out component members, while disposing all shafts in the front-rear direction of a vehicle.

In addition, it is an object of the present invention is to provide a transmission system intended to improve the serviceability of a transmission by dividing a crankcase into parts in the longitudinal direction and disposing all of shafts in the longitudinal direction of a vehicle, to make the transmission compact by making effective use of space, and to optimize the arrangement of the members of the transmission system.

In order to solve the above-mentioned problems in the prior art, the present invention resides in a transmission for an internal combustion engine, including a crankshaft disposed in parallel to the operating direction of a vehicle body, and a forward-running/backward-running changeover mechanism, wherein the supply sources of a working oil and a lubricating oil for an automatic transmission are disposed concentratedly on the side of a front crankcase cover. The changeover mechanism is provided between a rear crankcase and a rear crankcase cover. A forward-running/backward-running changeover shift drum is disposed on the upper side of a plane containing the axis of a main shaft and the axis of a counter shaft of the transmission. One end portion of a shift spindle projects from the rear crankcase cover at a position on a lateral side of the shift drum.

According to the present invention constituted as above, the supply sources of the working oil and the lubricating oil for the automatic transmission are disposed concentratedly on the side of the front crankcase cover, so that it is easy to perform an inspection and/or maintenance of the hydraulic oil system or systems.

In addition, the forward-running/backward-running changeover mechanism is provided between the rear crankcase and the rear crankcase cover, and the changeover shift drum is disposed on the upper side of the plane containing the axis of the main shaft and the axis of the counter shaft of the transmission. Therefore, it is possible to effectively utilize space, to reduce the horizontal projection area of the transmission and to dispose a fuel tank and the like in a space on the lower side. Besides, since the shift spindle can be disposed at a high position, it is possible to easily protect a connection portion from a collision with stones or the like, without providing a rigid cover.

Moreover, according to the present invention, one end portion of the shift spindle projects from the rear crankcase cover at a position on a lateral side of the shift drum, so that an operation cable connected to a shift lever can be easily fitted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
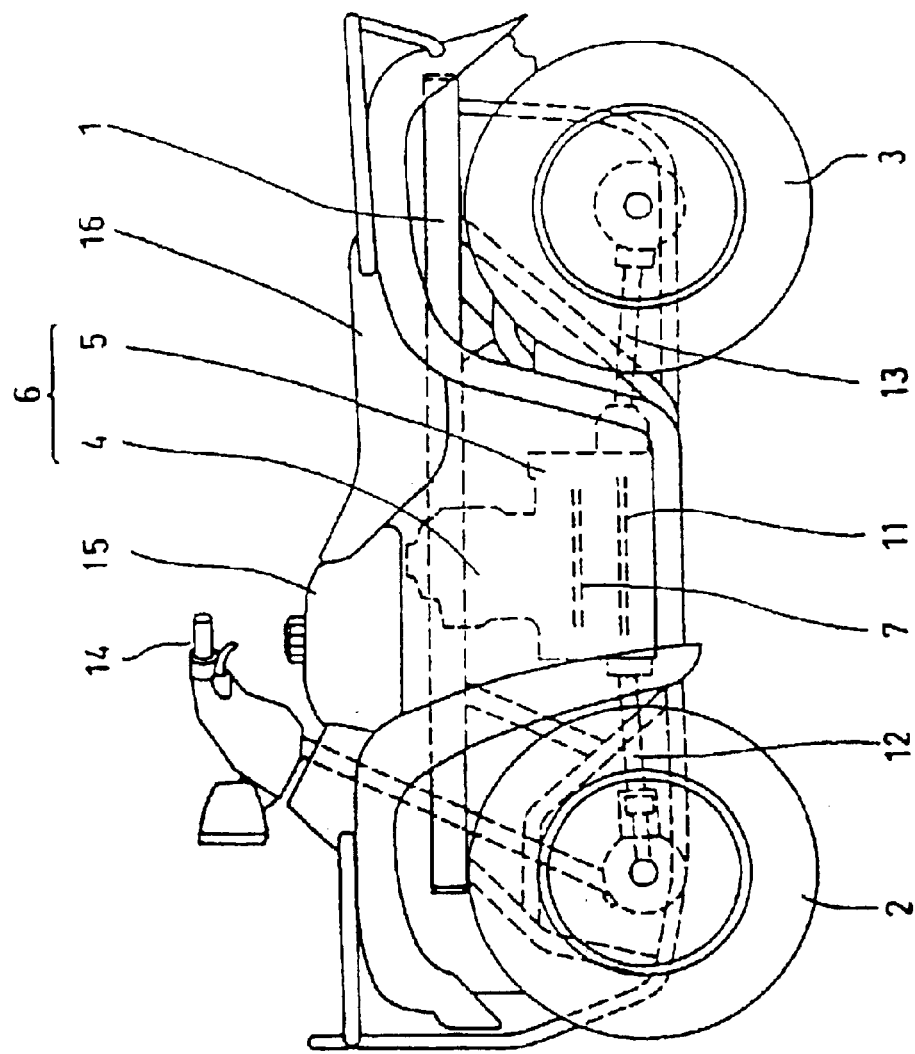
FIG. 1 is a side view of a four-wheel buggy car (saddle ride type vehicle for operating on wasteland) on which an internal combustion according to the present invention is mounted.

FIG. 1 is a side view of a four-wheel buggy car (saddle ride type vehicle for operating on wasteland) wherein an internal combustion engine with an oil hydraulic type automatic transmission according to the present invention is mounted. The buggy car has a structure in which left-right pairs of front wheels 2 and rear wheels 3 are provided, respectively, at front and rear portions of a vehicle body frame 1, and a power unit 6 integrally constituting an internal combustion engine 4 and a transmission 5 is supported on a central portion of the vehicle body frame 1. The power unit 6 includes a crankshaft 7 directed in the front-rear direction of the vehicle body.

The rotation of the crankshaft 7 is transmitted through a main shaft 8, a counter shaft 9, and an intermediate shaft 10 (all shown in FIG. 4) of the transmission to an output shaft 11. These shafts are all parallel to the crankshaft, and are disposed in the front-rear direction of the vehicle body. The front wheels 2 are driven by a front wheel drive shaft 12 connected to the front end of the output shaft 11, while the rear wheels 3 are driven by a rear wheel drive shaft 13 connected to the rear end of the output shaft 11. A steering handle 14, a fuel tank 15, and a saddle type seat 16 are provided, in this order from the front side, at upper portions of the vehicle body.

Figure 2:
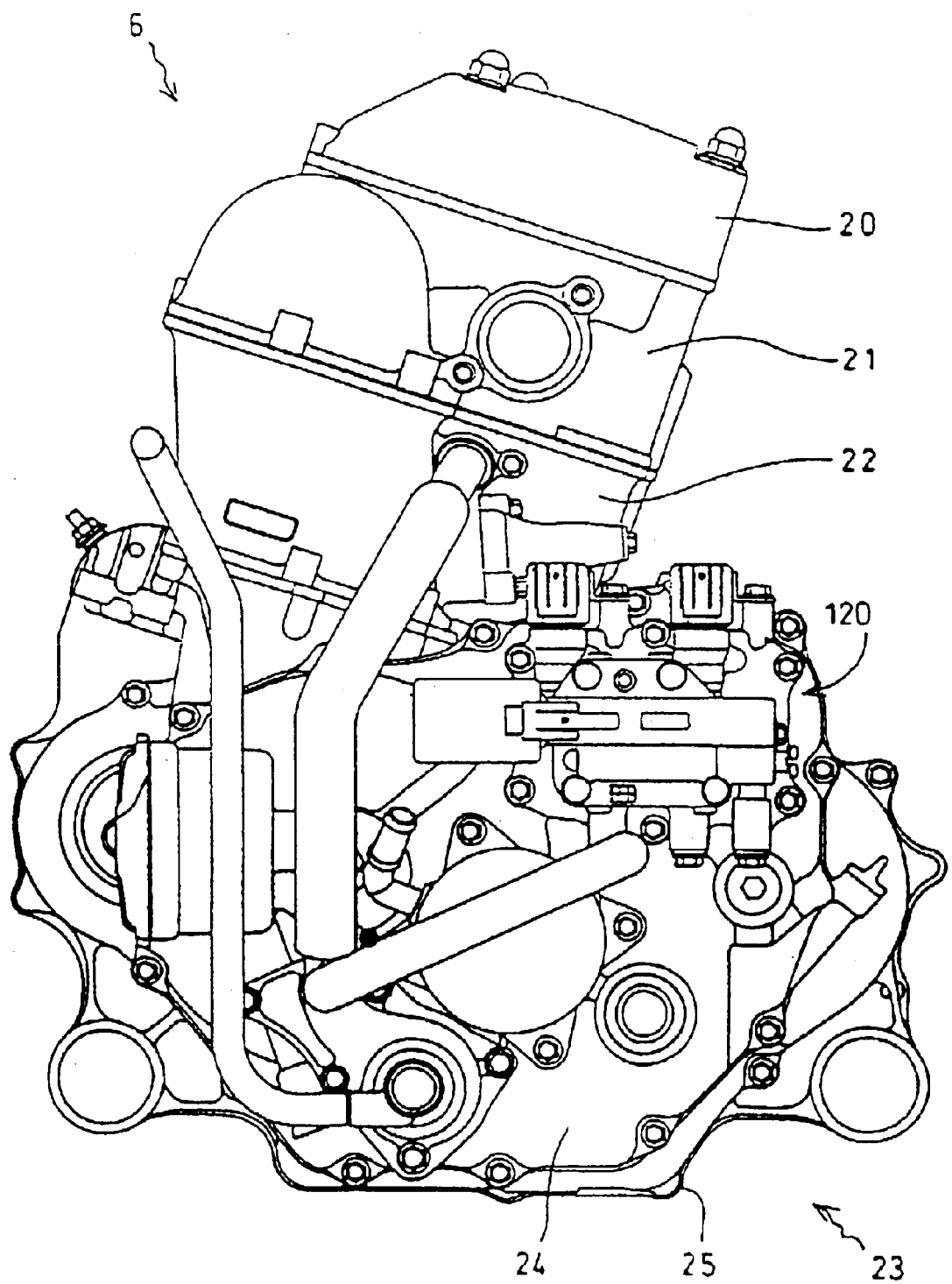
FIG. 2 is a front view of a power unit according to the present invention.

FIG. 2 is a front view of the power unit 6 according to the present invention, wherein the front surface of the power unit 6 is viewed from the front side. A main body portion of the power unit 6 is generally composed of four portions, namely, a cylinder head cover 20, a cylinder head 21, a cylinder block 22, and a crankcase 23, in this order from the upper side.

Figure 3:
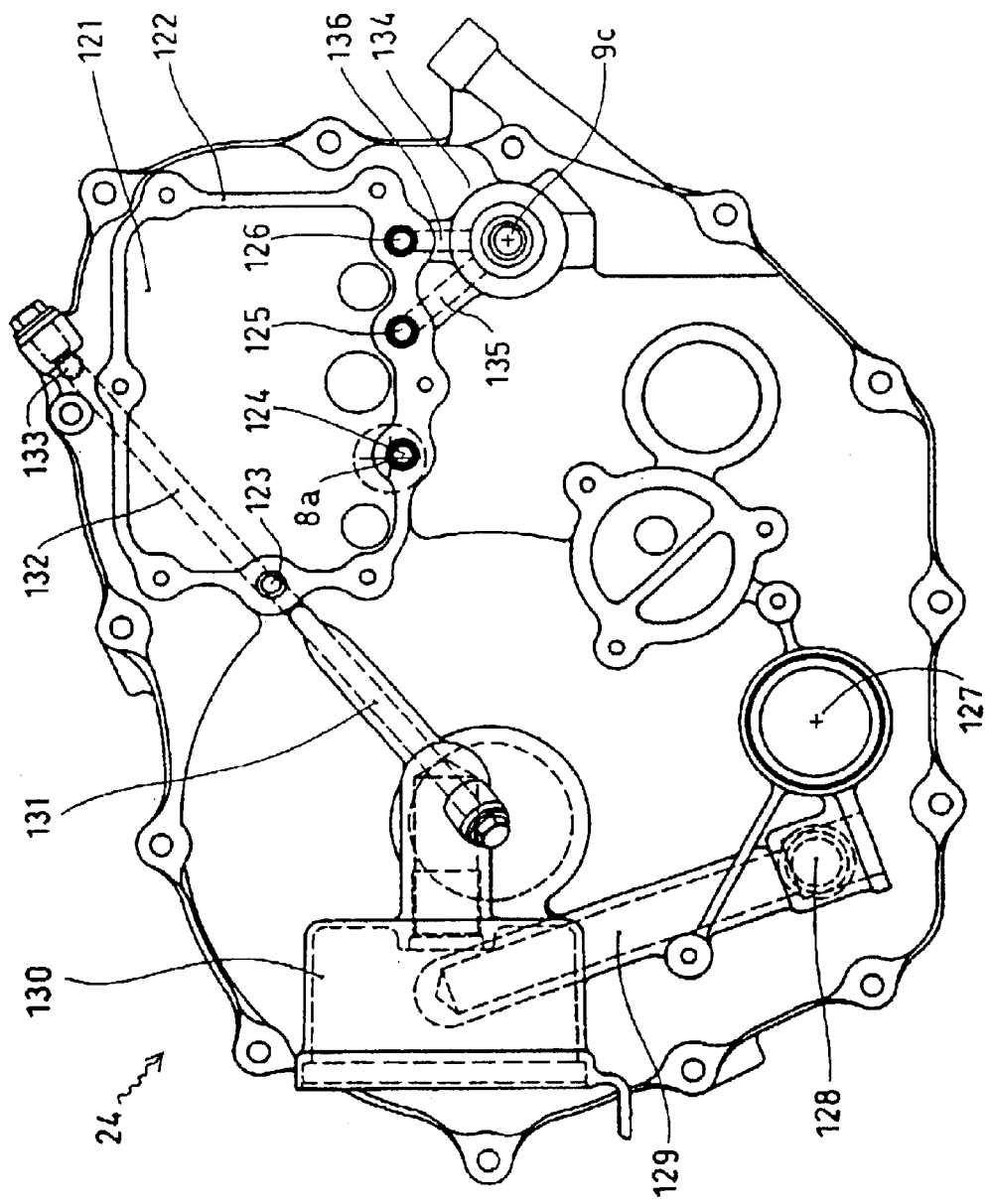
FIG. 3 is a view of a front crankcase cover from the front side.

In addition, the crankcase 23 is divided in a plane orthogonal to the crankshaft 7 into four portions, forming a front crankcase cover 24, a front crankcase 25, a rear crankcase 26, and a rear crankcase cover 27 (these are partially shown in FIGS. 5 and 6), in this order from the front side. In FIG. 2, the front crankcase cover 24 is seen, and the front crankcase 25 is partially illustrated in the surroundings thereof. Various equipments and piping are fitted to a front surface of the front crankcase cover 24. FIG. 3 is a view of only the front crankcase cover 24 from the front side, and FIG. 4 is a view of the front crankcase 25 from the front side.

Figure 4:
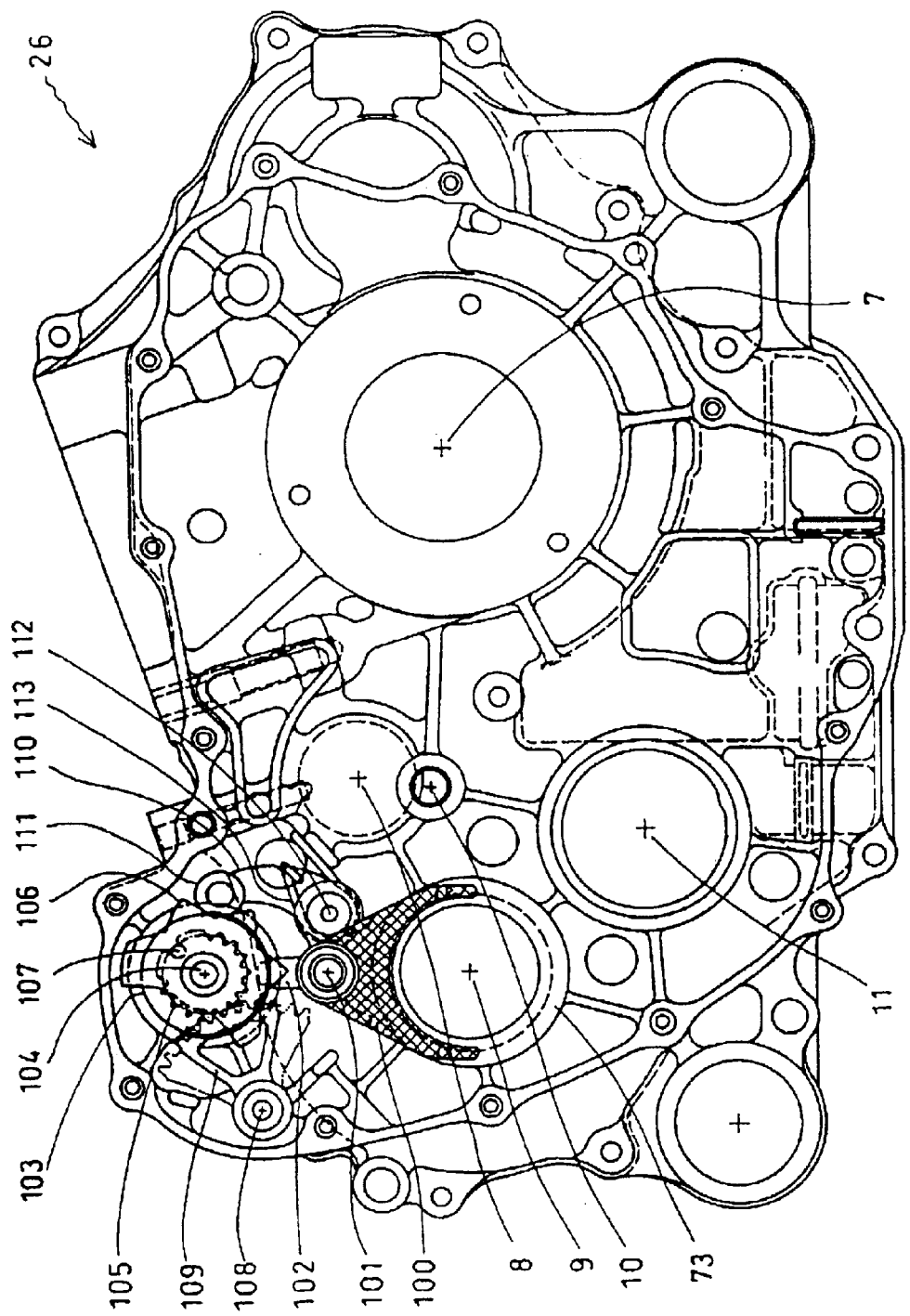
FIG. 4 is a view of a rear crankcase from the rear side.
Figure 5:
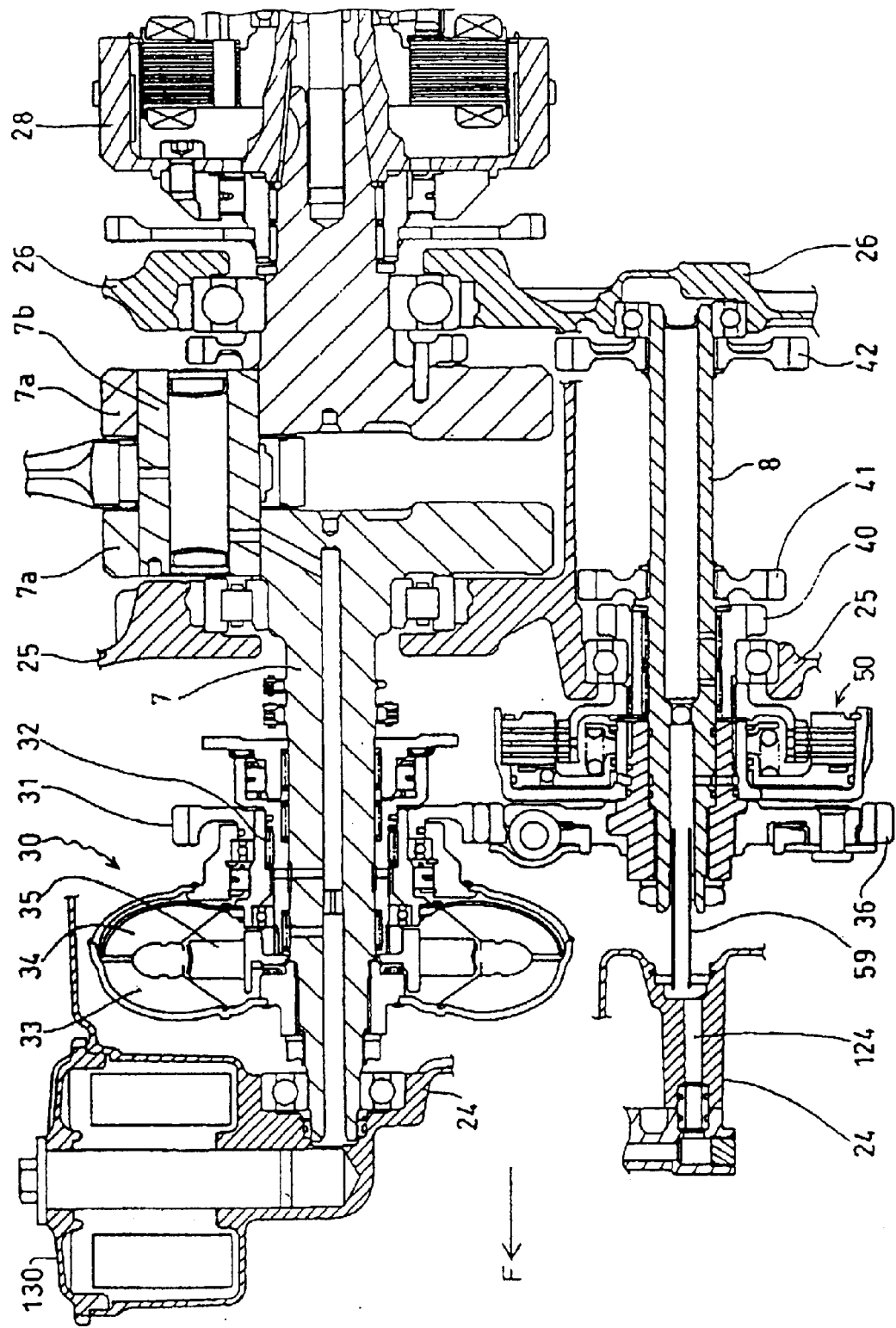
FIG. 5 is a vertical sectional view of the inside of a crankcase, showing the relationship between a crankshaft and a main shaft.
Figure 6:
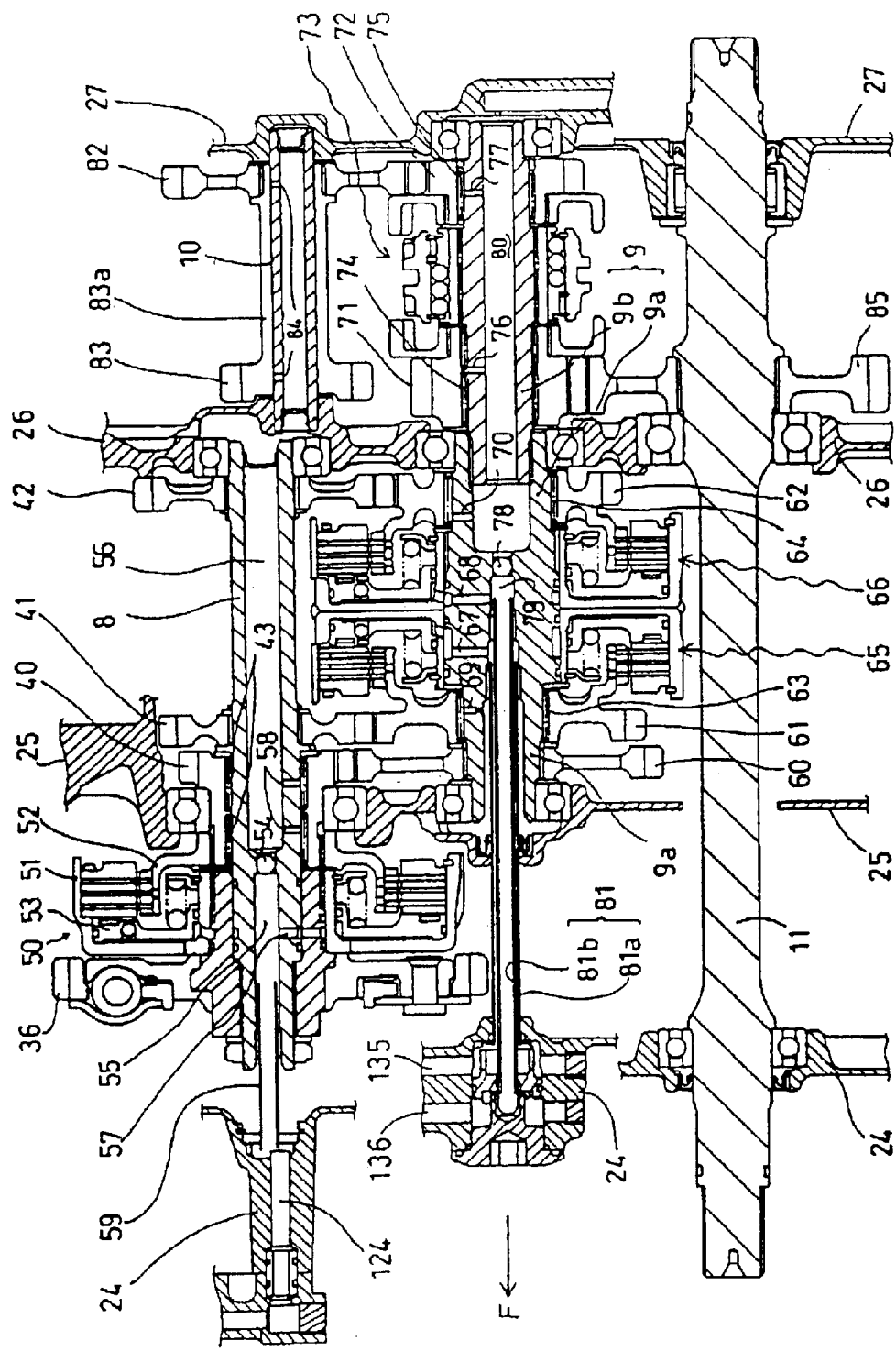
FIG. 6 is a vertical sectional view of the inside of the crankcase, showing the relationship among the main shaft, a counter shaft, an intermediate shaft, and an output shaft.

FIG. 4 shows the positions of the crankshaft 7, the main shaft 8, the counter shaft 9, the intermediate shaft 10, and the output shaft 11 of the transmission. FIGS. 5 and 6 are vertical sectional views of the inside of the crankcase passing through main shafts in the crankcase, in which FIG. 5 shows the relationship between the crankshaft 7 and the main shaft 8, and FIG. 6 shows the relationship among the main shaft 8, the counter shaft 9, the intermediate shaft 10, and the output shaft 11. In these figures, arrow F indicates the front or forward direction.

FIG. 5 shows a power transmission mechanism between the crankshaft 7 and the main shaft 8. The crankshaft 7 is supported on the front and rear crankcases 25 and 26 through bearings. A front extended portion of the crankshaft 7 is supported on the front crankcase cover 24 through a bearing. The crankshaft 7 is divided into front and rear portions, which are connected by a crank pin 7b at a crank web 7a. An AC generator 28 for generating power by rotation of the crankshaft 7 is fitted to the rear end of the crankshaft 7.

The crankshaft 7 is provided with a primary driving gear 31 through a torque converter 30. The primary driving gear 31 is rotatably supported on the crankshaft 7 through a needle bearing 32. On the other hand, the torque converter 30 includes a pump impeller 33 fixed to the crankshaft 7, a turbine runner 34 opposed thereto and a stator 35. The primary driving gear 31, rotatable in relation to the crankshaft 7, is connected to the turbine runner 34 and power from the crankshaft 7 is transmitted to the primary driving gear 31 through the working oil. A primary driven gear 36, constantly meshed with the primary driving gear 31, is fixed to a front end portion of the main shaft 8 of the transmission. The rotation of the crankshaft 7 is transmitted to the main shaft 8 through primary speed reduction performed by the primary driving gear 31 and the primary driven gear 36.

FIG. 6 shows a power transmission mechanism among the main shaft 8, the counter shaft 9, the intermediate shaft 10, and the output shaft 11 of the transmission. The main shaft 8 of the transmission is supported on the front and rear crankcases 25 and 26 through bearings. The main shaft 8 is provided with a first gear position driving gear 40, a second gear position driving gear 41, and a third gear position driving gear 42, which differ in the number of teeth according to speed reduction ratios. The second gear position driving gear 41 and the third gear position driving gear 42 are fixed gears, which are fixed on the main shaft 8, while the first gear position driving gear 40 is rotatably supported on the main shaft 8 through a needle bearing 43. In the description below, generally, a gear rotatably supported on a rotary shaft through a needle bearing is called a floating gear.

A first gear position oil hydraulic type multiple disk clutch 44 is intermediately provided between the main shaft 8 and the first gear position driving gear 40. The clutch has a clutch outer 51 fixed to the main shaft 8, and a clutch inner 52 connected to the first gear position driving gear 40. A pressure plate 53 movable in the axial direction is fitted to the clutch outer 51. The main shaft 8 is provided with a center hole steppedly varied in inside diameter on the centerline thereof. A steel ball 54 is pressed into a narrowest portion of the center hole to partition the center hole into a front portion center hole 55 and a rear portion center hole 56. The main shaft 8 is provided with a working oil supply hole 57 for communicating the front center hole 55 with the first gear position oil hydraulic type multiple disk clutch 50, and a lubricating oil supply hole 58 for communicating the rear portion center hole 56 with the needle bearing 43.

The working oil for the first gear position oil hydraulic type multiple disk clutch 50 is fed from the side of the front crankcase cover 24 to the front portion center hole 55 through a working oil supply pipe 59, and is supplied to the clutch 50 through the working oil supply hole 57. The working oil is supplied to a position between the clutch outer 51 and the pressure plate 53. With the pressure plate 53 moved by the oil pressure, the clutch is set into a connected condition, whereby the first gear position driving gear 40 is fixed to the main shaft 8, and the rotation of the main shaft 8 is transmitted to the first gear position driving gear 40.

The counter shaft 9 includes a front portion counter shaft 9a and a rear portion counter shaft 9b, which are integrated with each other to form the counter shaft 9. The counter shaft 9 is supported on the front crankcase 25, the rear crankcase 26, and the rear crankcase cover 27 through bearings. The front portion counter shaft 9a is provided with a first gear position driven gear 60, a second gear position driven gear 61, and a third gear position driven gear 62, which are constantly meshed respectively with the first gear position driving gear 40, the second gear position driving gear 41, and the third gear position driving gear 42 on the main shaft 8.

The first gear position driven gear 60 is a fixed gear fixed to a shaft, while the second gear position driven gear 61 and the third gear position driven gear 62 are floating gears, which are supported rotatably in relation to the counter shaft 9 through needle bearings 63 and 64, respectively. A second gear position oil hydraulic type multiple disk clutch 65 and a third gear position oil hydraulic type multiple disk clutch 66 are intermediately provided between the counter shaft 9 and these floating gears, respectively. In these clutches, a clutch outer is fixed to the counter shaft 9, and a clutch inner is connected to the floating gear. The constitution and actions of these clutches are the same as those of the above-mentioned first gear position oil hydraulic type multiple disk clutch 50. Working oil is supplied through working oil supply holes 67 and 68 formed in the counter shaft, whereby floating of the floating gears is stopped, to enable transmission of power, thereby performing a speed reduction at the second gear position or the third gear position. Lubricating oil supply holes 69 and 70 leading to the needle bearings 63 and 64 for bearing the second gear position driven gear 61 and the third gear position driven gear 62 are also formed in the counter shaft 9.

The counter shaft 9 includes front portion counter shaft 9a and the rear portion counter shaft 9b integrated with each other and is provided with a center hole which is partitioned into a front portion center hole 79 and a rear portion center hole 80 by a steel ball 78 press fitted in a narrowest portion thereof The supply of a working oil to the second and third gear position oil hydraulic type multiple disk clutches 65 and 66 is conducted from the side of the front crankcase cover 24 through a double-wall pipe 81. The double-wall pipe 81 includes an outer pipe 81a and an inner pipe 81b. The working oil for the second gear position oil hydraulic type multiple disk clutch 65 is supplied through an oil passage between the outer pipe 81a and the inner pipe 81b and through the working oil supply hole 67. The working oil for the third gear position oil hydraulic type multiple, disk clutch 66 is supplied through an oil passage inside the inner pipe 81b and the working oil supply hole 68.

The rear portion counter shaft 9b is provided with a forward-running driving gear 71 and a backward-running driving gear 72. These are both floating gears, of which the one engaged with a manual dog clutch 73 provided at an intermediate position therebetween is fixed to a shaft, whereby transmission of power is enabled. Lubricating oil supply holes 76 and 77 for supplying a lubricating oil to needle bearings 74 and 75, respectively, bearing the forward-running driving gear 71 and the backward-running driving gear 72 are formed in the rear portion counter shaft 9b.

The intermediate shaft 10 is supported on the rear crankcase 26 and the rear crankcase cover 27. A first intermediate gear 82 constantly meshed with the backward-running driving gear 72 and a second intermediate gear 83 connected to the first intermediate gear 82 through a long sleeve portion 83a are rotatably held on the intermediate shaft 10.

The output shaft 11 is supported on the front crankcase cover 24, the rear crankcase 26, and the rear crankcase cover 27 through bearings. The output shaft 11 pierces through the front crankcase 25 without making contact with the front crankcase 25. Further, an output shaft driven gear 85, constantly meshed with the forward-running driving gear 71 and the second intermediate gear 83, is fixed onto the output shaft 11. The output shaft driven gear 85 is driven for forward rotation or driven for reverse rotation through the gear with that the dog clutch 73 is engaged, whereby the output shaft 11 is rotated in a direction suitable for forward running or backward operating of the vehicle. Such a control is made that the reverse-rotation driving is connected only when the counter shaft 9 is rotating in the first gear position.

Figure 7:
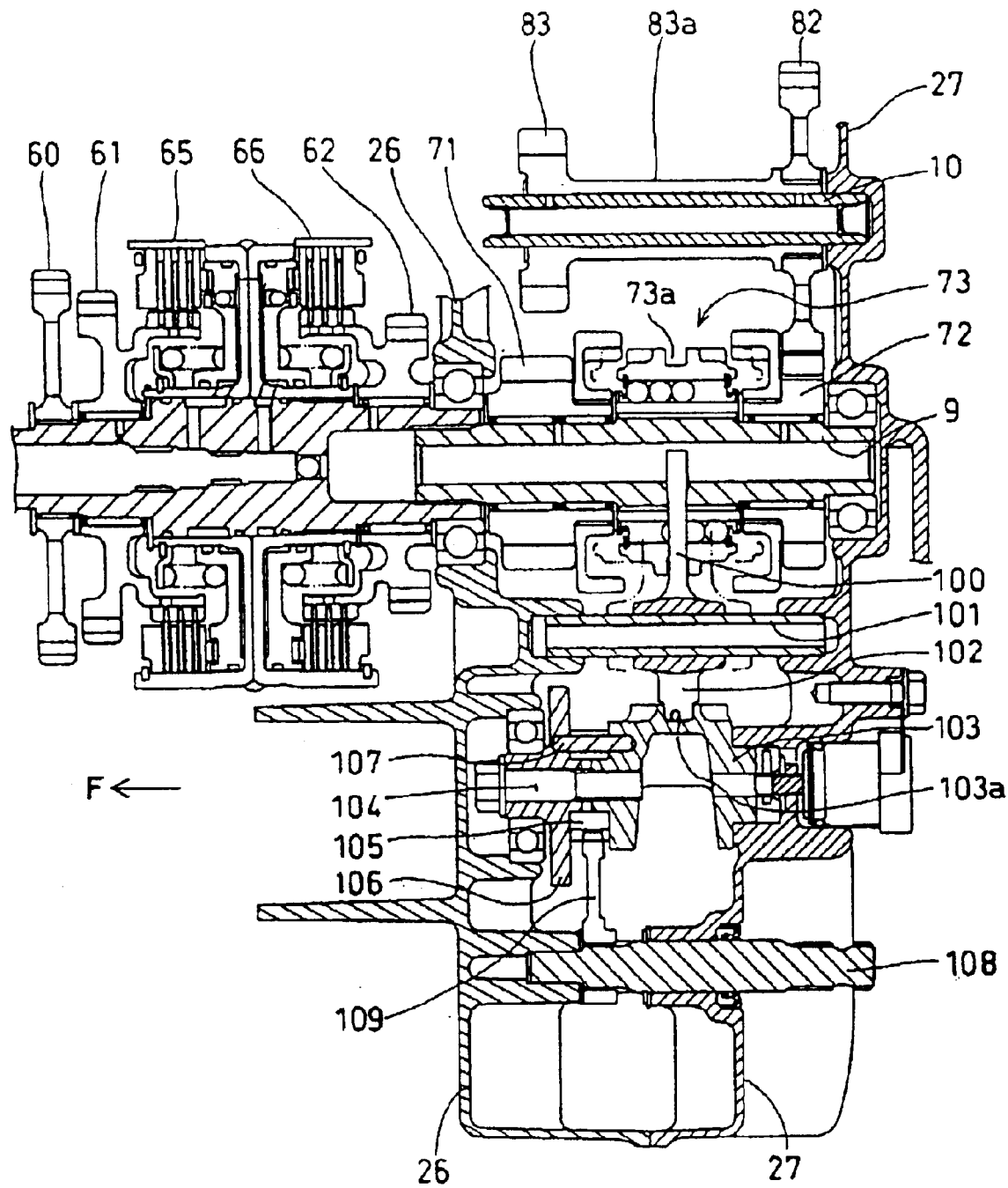
FIG. 7 is a vertical sectional view showing a driving mechanism of a forward-running/backward running changeover dog clutch.

Next, a driving mechanism of the above-mentioned dog clutch 73 for changeover between forward operating and backward operating of the vehicle will be described referring to FIGS. 7 and 4. In FIG. 7, an outside surface of the dog clutch 73 is provided with a circumferential groove 73a, and a fork portion (double-hatched in FIG. 4) of a shift fork 100 is fitted in the groove. The shift fork 100 is fitted to a guide shaft 101 so as to be slidable in the axial direction. The guide shaft 101 is a fixed shaft supported on the rear crankcase 26 and the rear crankcase cover 27. A shift pin 102 projects integrally on the shift fork 100 on the side opposite to the fork portion, and the tip end of the shift pin 102 is slidably fitted in a spiral groove 103a formed in a shift drum 103.

Since the spiral groove 103a of the shift drum 103 is a short groove ranging over about one half of the circumference, unnecessary portions of the shift drum 103 are cut out for a reduction in weight. The shift drum 103 is supported by a drum shaft 104. A drum driven gear 105 and a shift cam 106 are also fitted to the drum shaft 104. The shift drum 103, the drum driven gear 105, and the shift cam 106 are mutually restricted in a turning direction by a conjunction pin 107 so that they are turned as one body.

On the other hand, a shift spindle 108 is turnably supported by the rear crankcase 26 and the rear crankcase cover 27. The shift spindle 108 is disposed on a lateral side of the shift drum 103 as shown in FIG. 4, and has one end portion (a rear end portion in the example shown) projecting rearwardly from the rear crankcase cover 27 as shown in FIG. 7.

In addition, a sector form gear 109 meshed with the drum driven gear 105 is fixed to the shift spindle 108. With the shift spindle 108 turned, the drum driven gear 105, the shift drum 103, and the shift cam 106 are driven to turn by the sector form gear 109. The rear end of the shift spindle 108 is connected to a shift lever (not shown) provided on the handle 14 of the vehicle through an operation cable (not shown), and is manually operated for turning.

The shift cam 106 is in the form of a star-shaped plate, as shown in FIG. 4, and a roller 111 at the tip end of a shift drum stopper 110 makes contact with the outer circumference of the shift cam 106. The shift drum stopper 110 is turnably supported by a pin 112. The roller 111 is pressed against the outer circumference of the shift cam 106 by a spring 113. This mechanism is a device for holding the turning position of the shift drum 103, and is so constructed that the position of the shift drum 103 becomes stable when the roller 111 drops into the center of each of valley portions of the outer circumference of the shift cam 106. The stable positions correspond respectively to the conditions of forward operating, neutral, and backward operating.

When the shift lever provided on the handle 14 of the vehicle is turned from a neutral position to a forward operating or backward operating position, the sector form gear 109 is turned together with the shift spindle 108, whereby the drum driven gear 105 is turned, to be stopped at the stable position of the shift cam 106. In this process, the shift drum 103 is turned around the drum shaft 104 together with the drum driven gear 105 by the action of the conjunction pin 107, and pushes the shifter pin 102 by an edge of the spiral groove 103a at the outer circumference thereof. The shift fork 100 supported by the guide shaft 101 is pushed and slidden in the axial direction, and pushes the dog clutch 73 in the axial direction of the counter shaft through the circumferential groove 73a of the dog clutch 73. At this time, a projection provided at an end portion of the dog clutch 73 is engaged with either of the forward-running driving gear 71 or the backward-running driving gear 72, and fixes either of the gears to the counter shaft 9, thereby enabling transmission of power, whereby the vehicle is made to operate forward or backward.

In the present embodiment, as shown in FIG. 7, the mechanism for changeover between forward operating and backward operating of the vehicle is provided between the rear crankcase 26 and the rear crankcase cover 27. In addition, as shown in FIG. 4, the changeover shift drum 103 is disposed on the upper side of a changeover containing the axis of the main shaft 8 and the axis of the counter shaft 9 of the transmission.

The pairs of the first gear position driving gear 40 and the first gear position driven gear 60, the second gear position driving gear 41 and the second gear position driven gear 61, and the third gear position driving gear 42 and the third gear position driven gear 62 in the transmission described above are all, respectively, constantly meshed gears, and which of the speed change ratios is effected is determined by which of the oil hydraulic type multiple disk clutches 50, 65, and 66 is set into the connected condition. The control of the oil pressures for this is conducted by a valve body 120 assembled as an integral oil pressure control system by collecting solenoid valves and oil pressure changeover valves, which is fitted to a front surface of the front crankcase cover 24 as shown in FIG. 2.

The valve body 120 is fitted to a fitting recessed portion 121 of the front crankcase cover 24 shown in FIG. 3, and is fixed to a fitting surface 122 in the surroundings through a gasket. In the fitted condition, a front half of the valve body 120 is exposed to the outside of the front crankcase cover 24, while a rear half is embedded in the fitting recessed portion 121 of the front crankcase cover 24. The fitting surface 122 of the front crankcase cover 24 is formed to be parallel to a partition surface of the crankcase.

Transfer of the working oil between the front crankcase cover 24 and the valve body 90 is performed between a plurality of working oil inlet/outlet ports provided in the fitting surface 122 and a plurality of working oil inlet/outlet ports provided in the fitting surface on the side of the valve body 120 at positions opposed to the former working oil inlet/outlet ports. The gasket intermediately disposed between the fitting surfaces of the valve body 120 and the front crankcase cover 24 is provided with oil passage holes at positions corresponding to the plurality of working oil inlet/outlet ports.

FIG. 3 shows concretely the working oil inlet/outlet ports provided in the valve body fitting surface 122 of the front crankcase cover 24. Namely, a working oil supply port 123 leads from the front crankcase cover 24 towards the valve body 120, a working oil inlet 124 leads from the valve body 120 towards the first gear position oil hydraulic type multiple disk clutch 50, a working oil inlet 125 leads from the valve body 120 towards the second gear position oil hydraulic type multiple disk clutch 65 and a working oil inlet 126 leads from the valve body 120 towards the third gear position oil hydraulic type multiple disk clutch 66.

In FIG. 3, an extension position 127 of a pump shaft centerline is illustrated of an oil pump, which is not shown. The oil pump is provided between the front crankcase cover 24 and the front crankcase 25. Oil fed from the oil pump is fed to an oil filter 130 through oil passages 128 and 129 formed in the inside of a wall surface of the front crankcase cover 24. Then, after foreign matter is filtered away from the oil by the filter, a portion of the oil is fed out as a working oil for a torque converter, while the residual portion is fed out through an oil passage 131. A portion of the oil having passed through the oil passage 131 is fed through the working oil supply port 123 into the valve body 120. The residual portion of the oil is fed out through an oil passage 132 and an oil passage 133 extending orthogonally to the oil passage 132 towards the front crankcase 25, as a lubricating oil for the bearing portions for the speed change gears and the like.

In addition, in FIG. 3, symbol 8*a* denotes an extension position of the centerline of the main shaft 8 of the transmission. The working oil fed out to the working oil inlet 124 leading from the valve body 120 towards the first gear position oil hydraulic type multiple disk clutch 50 is fed into the front portion center hole 55 of the main shaft 8 through the working oil supply pipe 59 provided bridgingly from a rear surface of the front crankcase cover 24 to the front portion center hole 57, as shown in FIG. 6, and is supplied to the first gear position oil hydraulic type multiple disk clutch 50 through the working oil supply hole 57.

Besides, in FIG. 3, symbol 9*c* denotes an extension position of the centerline of the counter shaft 9. This portion of the front crankcase cover 24 is provided with an oil passage connection portion 134, and oil passages 135 and 136 are formed that lead respectively from the working oil inlet 125 leading towards the second gear position oil hydraulic type multiple disk clutch 65 and the working oil inlet 126 leading toward the third gear position oil hydraulic type multiple disk clutch 66 to the oil passage connection portion 134. The working oil fed from the valve body 120 to the working oil inlet 125 or 126 is fed from the oil passage connection portion 134 to the front portion center hole 79 of the counter shaft 9 through either of the inner and outer passages of the working oil supply double-wall pipe 81 provided bridgingly to the front portion center hole 79, as shown in FIG. 6, and is supplied to the second gear position oil hydraulic type multiple disk clutch 65 or the third gear position oil hydraulic type multiple disk clutch 66.

As described above, in the present embodiment, the supply sources of the working oil and the lubricating oil for the automatic transmission are arranged concentratedly on the side of the front crankcase cover 24.

Figure 8:
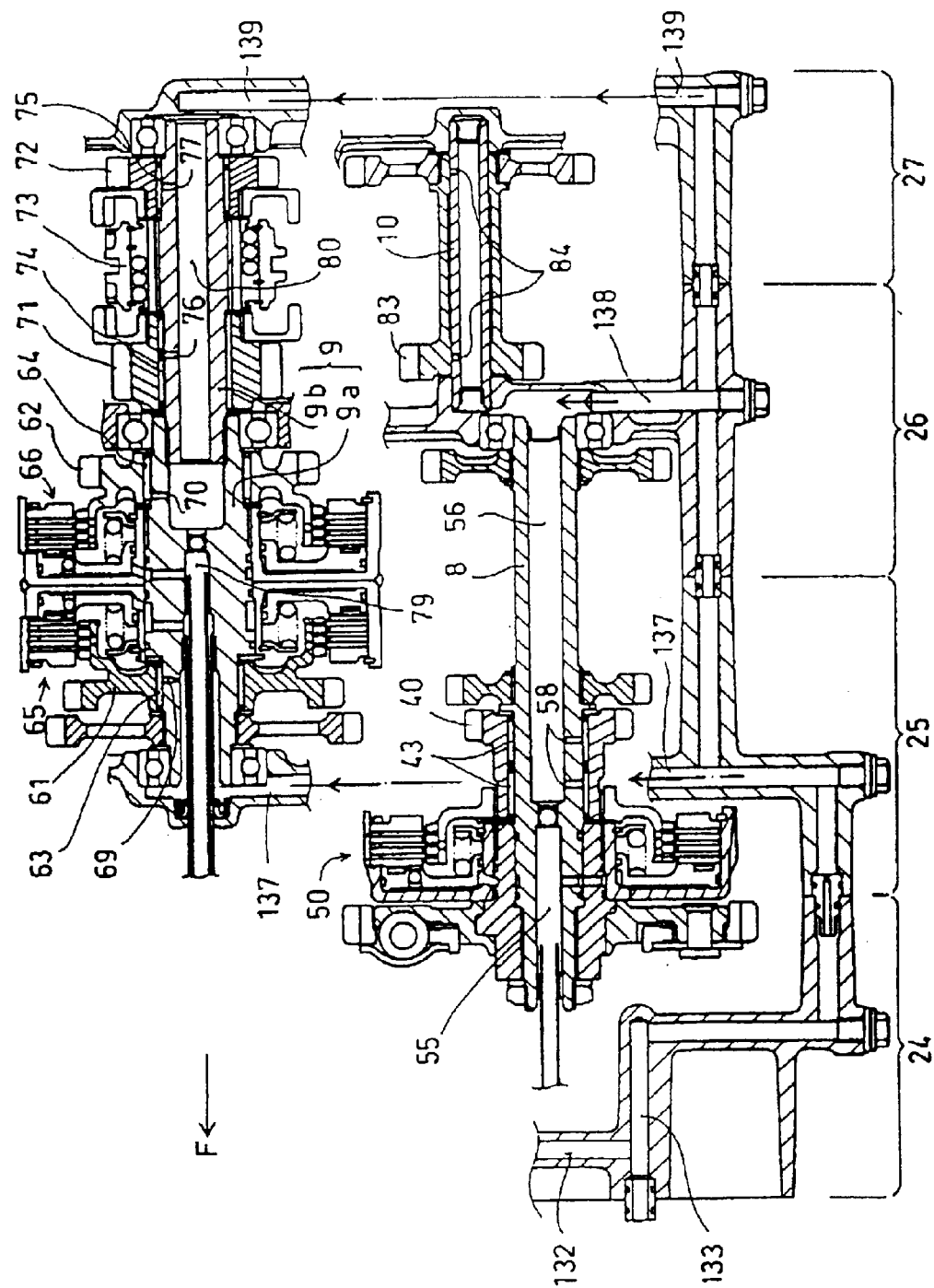
FIG. 8 is a vertical sectional view showing an oil passage for supplying a lubricating oil.

FIG. 8 is a vertical sectional view of an oil passage for supplying the lubricating oil, which follows to the oil passages 132 and 133 shown in FIG. 3. The lubricating oil supply passage has a structure in which oil holes bored in the surrounding portions of the front crankcase cover 24, the front crankcase 25, the rear crankcase 26, and the rear crankcase cover 27 are in communication with each other. As described above, the working oil for the clutches is all supplied directly from the front crankcase cover 24, while the lubricating oil for the bearing portions for the speed change gears is supplied through the oil passages in the front crankcase 25, the rear crankcase 26, and the rear crankcase cover 27.

An oil passage 137 bored in the front crankcase 25 is an oil passage for supplying the lubricating oil to the needle bearing 63 for the second gear position driven gear 61 on the counter shaft 9, through an oil passage between the front portion counter shaft 9*a* and the outer pipe 81*a* (FIG. 6) and through the lubricating oil supply hole 69. An oil passage 138 bored in the rear crankcase 26 is an oil passage for supplying the lubricating oil from the side of the rear portion center hole 56 to the needle bearing 43 for the first gear position driving gear 40 on the main shaft 8 through the lubricating oil supply hole 58, and for supplying the lubricating oil from the center hole of the intermediate shaft 10 to a sliding portion between the intermediate shaft 10 and the second intermediate gear 83 through the lubricating oil supply hole 84. An oil passage 139 bored in the rear crankcase cover 27 is an oil passage for supplying the lubricating oil from the center hole 80 of the rear portion counter shaft 9b to the needle bearing 64 for the third gear position driven gear 62 through the lubricating oil supply hole 70, to the needle bearing 74 for the forward-running driving gear 71 through the lubricating oil supply hole 76, and to the needle bearing 75 for the backward-running driving gear 72 through the lubricating oil supply hole 77.

In the present embodiment, the supply sources of the working oil and the lubricating oil for the automatic transmission are arranged concentratedly on the side of the front crankcase cover 24, so that it is easy to perform maintenance and/or inspection of the oil hydraulic system.

In addition, in the present embodiment, the mechanism for changeover between forward operating and backward operating of the vehicle is provided between the rear crankcase 26 and the rear crankcase cover 27, and the changeover shift drum 103 is disposed on the upper side of a plane containing the axis of the main shaft 8 and the axis of the counter shaft 9 of the transmission. Therefore, it is possible to effectively utilize space, to reduce the horizontal projecting area of the transmission, and to lay out a fuel tank and the like in a space on the lower side. Besides, since the shift spindle 108 can be disposed at a high position, it is possible to easily protect a connection portion from a collision with stones and the like, without providing a rigid cover.

Furthermore, since the shift spindle 108 is disposed on a lateral side of the shift drum 103 and one end portion projects rearwards from the rear crankcase cover 27, the operation cable connected to the shift lever can be easily fitted.

According to this embodiment, since a crankcase is divided into parts in the longitudinal direction and all of shafts are disposed in the longitudinal direction of a vehicle, and sources for supplying working oil and lubricating oil to an automatic transmission are collectively disposed on a front crankcase cover side. Thus, it is possible to facilitate the maintenance and inspection of a pressure oil supply line and hence to improve the serviceability. Also, since a forward gear/reverse gear selecting mechanism is provided between a rear crankcase and a rear crankcase cover, it is possible to reduce a horizontal projection area of the transmission by making effective use of the space and hence to make the transmission compact.

Since a shift drum for forward/reverse selection is disposed over a line connecting a main shaft to a counter shaft, it is possible to dispose a shift spindle at a higher position, and hence to protect a connection portion of the shift spindle from being struck with stones without the need of the provision of any rigid cover.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission for an internal combustion engine, comprising:
   a crankshaft disposed in parallel to an operating direction of a vehicle body;
   a forward-running/backward-running changeover mechanism operatively connected to the transmission;
   supply sources of a working oil and a lubricating oil for the transmission are disposed concentratedly on the side of a front crankcase cover;
   said changeover mechanism is provided between a rear crankcase and a rear crankcase cover;
   a forward-running/backward-running changeover shift drum is disposed on an upper side of a plane containing an axis of a main shaft and an axis of a counter shaft of said engine; and
   one end portion of a shift spindle projects from said rear crankcase cover at a position on a lateral side of said shift drum.

2. The transmission for an internal combustion engine according to claim 1, and further including an oil filter operatively mounted on the front crankcase cover with oil passages formed on an inside wall surface of the front crankcase cover for supplying oil to the transmission.

3. The transmission for an internal combustion engine according to claim 1, wherein disposing the changeover shift drum on the upper side of a plane containing the axis of the main shaft and the axis of the counter shaft reduces a horizontal projection area of the transmission, thereby reducing a space required by the transmission.

4. The transmission for an internal combustion engine according to claim 3, and further including a shift guide disposed in a space below the changeover shift drum.

5. The transmission for an internal combustion engine according to claim 1, wherein said shift spindle is disposed at an upper side of the transmission for protecting the shift spindle from a collision with debris.

6. The transmission for an internal combustion engine according to claim 1, and further including a shift lever operatively connected to said shift spindle projecting from the rear crankcase cover at a position on a lateral side of the shift drum.

7. A transmission system of an internal combustion engine, including a crankshaft disposed in parallel to the operating direction of a vehicle, and a forward gear/reverse gear selecting mechanism, comprising:
   sources for supplying working oil and lubricating oil to the transmission are collectively disposed on a front crankcase cover side;
   said forward gear/reverse gear selecting mechanism is provided between a rear crankcase and a rear crankcase cover;
   a shift drum for forward/reverse selection is disposed over a line connecting a main shaft to a counter shaft; and
   a shift spindle projecting from the rear crankcase cover at a position on a lateral side of the shift drum.

8. The transmission system of an internal combustion engine according to claim 7, and further including an oil filter operatively mounted on the front crankcase cover with oil passages formed on an inside wall surface of the front crankcase cover for supplying oil to the transmission.

9. The transmission system of an internal combustion engine according to claim 7, wherein disposing the shift drum on the upper side of a plane containing an axis of the main shaft and an axis of the counter shaft reduces a horizontal projection area of the transmission, thereby reducing the space required by the transmission.

10. The transmission system of an internal combustion engine according to claim 9, and further including a shift guide disposed in a space below the shift drum.

11. The transmission system of an internal combustion engine according to claim 7, wherein the shift spindle is disposed at an upper side of the transmission for protecting the shift spindle from a collision with debris.

12. The transmission system of an internal combustion engine according to claim 11, and further including a shift lever operatively connected to said shift spindle projecting from the rear crankcase cover.

13. The transmission system of an internal combustion engine according to claim 1, wherein a front end of the shift spindle is supported by the rear crankcase.

14. The transmission system of an internal combustion engine according to claim 7, wherein a front end of the shift spindle is supported by the rear crankcase.

* * * * *